United States Patent
Lee et al.

(10) Patent No.: US 10,261,941 B2
(45) Date of Patent: Apr. 16, 2019

(54) DIGITAL AGING SYSTEM AND METHOD FOR OPERATING SAME

(71) Applicants: Kyoung Ah Lee, Goyang (KR); Myung Bean Song, Goyang (KR)

(72) Inventors: Kyoung Ah Lee, Goyang (KR); Myung Bean Song, Goyang (KR)

( * ) Notice: Subject to any disclaimer, the term of this patent is extended or adjusted under 35 U.S.C. 154(b) by 177 days.

(21) Appl. No.: 14/402,164

(22) PCT Filed: May 15, 2013

(86) PCT No.: PCT/KR2013/004287
§ 371 (c)(1),
(2) Date: Nov. 19, 2014

(87) PCT Pub. No.: WO2013/176433
PCT Pub. Date: Nov. 28, 2013

(65) Prior Publication Data
US 2015/0127617 A1    May 7, 2015

(30) Foreign Application Priority Data

May 24, 2012   (KR) .......................... 10-2012-0055178
Sep. 28, 2012   (KR) .......................... 10-2012-0108857

(51) Int. Cl.
*G06F 16/11*   (2019.01)
*G06Q 10/06*   (2012.01)

(52) U.S. Cl.
CPC ........... *G06F 16/113* (2019.01); *G06Q 10/06* (2013.01)

(58) Field of Classification Search
None
See application file for complete search history.

(56) References Cited

U.S. PATENT DOCUMENTS

| 7,320,070 | B2* | 1/2008 | Baum | ............... H04L 29/12018 |
| | | | | 713/153 |
| 2003/0037026 | A1* | 2/2003 | Bantz | ...................... G06F 21/10 |

(Continued)

FOREIGN PATENT DOCUMENTS

| CN | 101681290 A | 3/2010 |
| JP | 09091182 A | 4/1997 |

(Continued)

OTHER PUBLICATIONS

International Search Report in PCT/KR2013/004287, dated Jul. 31, 2013.

*Primary Examiner* — Tuankhanh D Phan
(74) *Attorney, Agent, or Firm* — Saliwanchik, Lloyd & Eisenschenk

(57) ABSTRACT

The present invention relates to a data-processing technology allowing data to be recognized as a being, i.e. an organism having life, by applying, to all digital data, a birth/old-age/sickness/death concept derived from nature and giving the time-limited functions of naming, changing, and extinction to the digital data which has traditionally been recognized by the attributes of perpetuity and infinite replication and reproduction with complete fidelity. More particularly, the present invention relates to a system allowing a user to easily determine data maintenance and deletion by managing the history of data distribution and representing the current state of use of the data through an aging effect (i.e. becoming old, gray, sick, or recovering), which applies to living things in nature.

13 Claims, 6 Drawing Sheets

(56) References Cited

U.S. PATENT DOCUMENTS

2003/0196094 A1* 10/2003 Hillis ..................... G06F 21/64
  713/179
2007/0030524 A1   2/2007 Murakoshi
2008/0263449 A1  10/2008 Schwartz et al.
2011/0282838 A1* 11/2011 Accapadi .......... G06F 17/30115
  707/638

FOREIGN PATENT DOCUMENTS

| JP | 2001-134529 A | 5/2001 |
| JP | 2003177991 A | 6/2003 |
| JP | 2004-206658 A | 7/2004 |
| JP | 2006048146 A | 2/2006 |
| JP | 2006-268391 A | 10/2006 |
| JP | 2009116939 A | 5/2009 |
| JP | 2011035675 A | 2/2011 |

* cited by examiner

DIGITAL AGING SYSTEM AND METHOD FOR OPERATING SAME

CROSS-REFERENCE TO RELATED APPLICATIONS

This application is the U.S. national stage application of International Application Serial No. PCT/KR2013/004287, filed May 15, 2013, which claims the benefit of Korean Applications Serial No. 10-2012-0055178, filed May 24, 2012, and Serial No. 10-2012-0108857, filed Sep. 28, 2012, which are hereby incorporated by reference in their entirety, including all figures, tables and drawings.

TECHNICAL FIELD

The present invention relates to a data-processing technology allowing data to be recognized as a being, i.e. an organism having life, by applying, to all digital data, a birth/old-age/sickness/death concept derived from nature and giving the time-limited functions of naming (birth), changing (sickness), and extinction (death) to the digital data which has traditionally been recognized by the attributes of perpetuity and infinite replication and reproduction with complete fidelity. Further, the present invention relates to an integrated data remote-control technology allowing a user to manage and trace the history of the data.

BACKGROUND ART

As the information society of the $21^{st}$ century is approaching and digital technology is developing and spreading fast, digital data are also pouring like a flood and come to exist online as garbage despite the fact that its usefulness has already been expired. Therefore, the present invention intends to solve data problems such as personal information leakage, absence of security and data management, etc.

For example, if a user searches for his/her own name through the Internet and finds the complaint he/she made a few years ago in a shopping mall site because of their delayed shipment, he/she would think about his personal information leakage and the right to delete the expired data, and at the same time he/she would feel the necessity of classifying and preserving useful data.

However, conventionally, only internet service providers are allowed to determine their policy on such data management, and users, on the other hand, do not have any measure to be able to control when to write a post or when to upload the data, and when the data should be deleted.

The present invention intends to delete data by setting a lifespan when the data is produced in the first place. If the data is determined worth preserving based on data creators' or data users' needs, the present invention also intends to provide a data-processing technology for more proactive classification, organization (extinction), and preservation by preserving classified data and their original service use environment in which the data was produced, so that next generation could use the data more conveniently.

Also, in such a process, most users tend to forget direct management for their own data and even they easily forget the fact that they generated the data by themselves. Therefore, to avoid the above issues, the present invention intends to help a user easily determine data maintenance and deletion by managing the history of data distribution and representing the current state of use of the data through an aging effect (i.e. becoming old, gray, sick, or recovering), which applies to living things in nature.

DISCLOSURE

Technical Problem

The present invention includes a tracing and recording service for the whole history of data distribution from a time of data creation to a time of data extinction; a presetting service for extinction time and an aging processing (becoming old, transformed, recovering, etc) of the data at the point of creating or distributing the data (uploading, posting, etc); a practice system for specific aging to be processed according to such setting logic; and a permanent preservation service for the data whose value is set (or proven) to be valid through the series of processes.

Technical Solution

Digital Aging System in accordance with the present invention (hereinafter, it is called "DAS") provides an advanced service which protects privacy on the network by allowing users to set and control deletion and revision rights for their own texts and files on the network, where the texts and files are shared and copied by others once uploaded on blogs or any bulletin boards. At the same time, the DAS allows service providers to solve overload of database thereof and increase of maintenance cost caused by unnecessary data flood.

The present invention, therefore, provides an automatic service of aging or data deletion according to optional time information set up by a user. To do this, a user need to download a separate program, called DAS client, from DAS service providers through their own terminals. After installing and running the program, if the user invokes a file, and sets up and saves options, a DAS processor is mounted on the file and provides the automatic service.

Also, database servers of the DAS service providers manage states and changes in service users' files through feedback received from the DAS processor according to a regular algorithm. Therefore, it is possible to achieve integrated control and management for the files.

Advantageous Effects

The present invention allows users to be able to preserve both data and their service use environment in which the data were created, if the data are classified to be worth preserving by data creators' or data users' needs.

In addition, the present invention makes integrated management possible for users' own data, which are all over the network, by setting up a timer at the time of data creation or by connecting a tracker.

The present invention also manages the history of data distribution for data creators; moreover, it provides an intelligent data management system which helps a user able to determine easily between data maintenance and deletion by representing the current state of use of the data through an aging effect which applies to living things in nature.

DESCRIPTION FOR MAIN PARTS OF THE DRAWINGS

Figure 1:
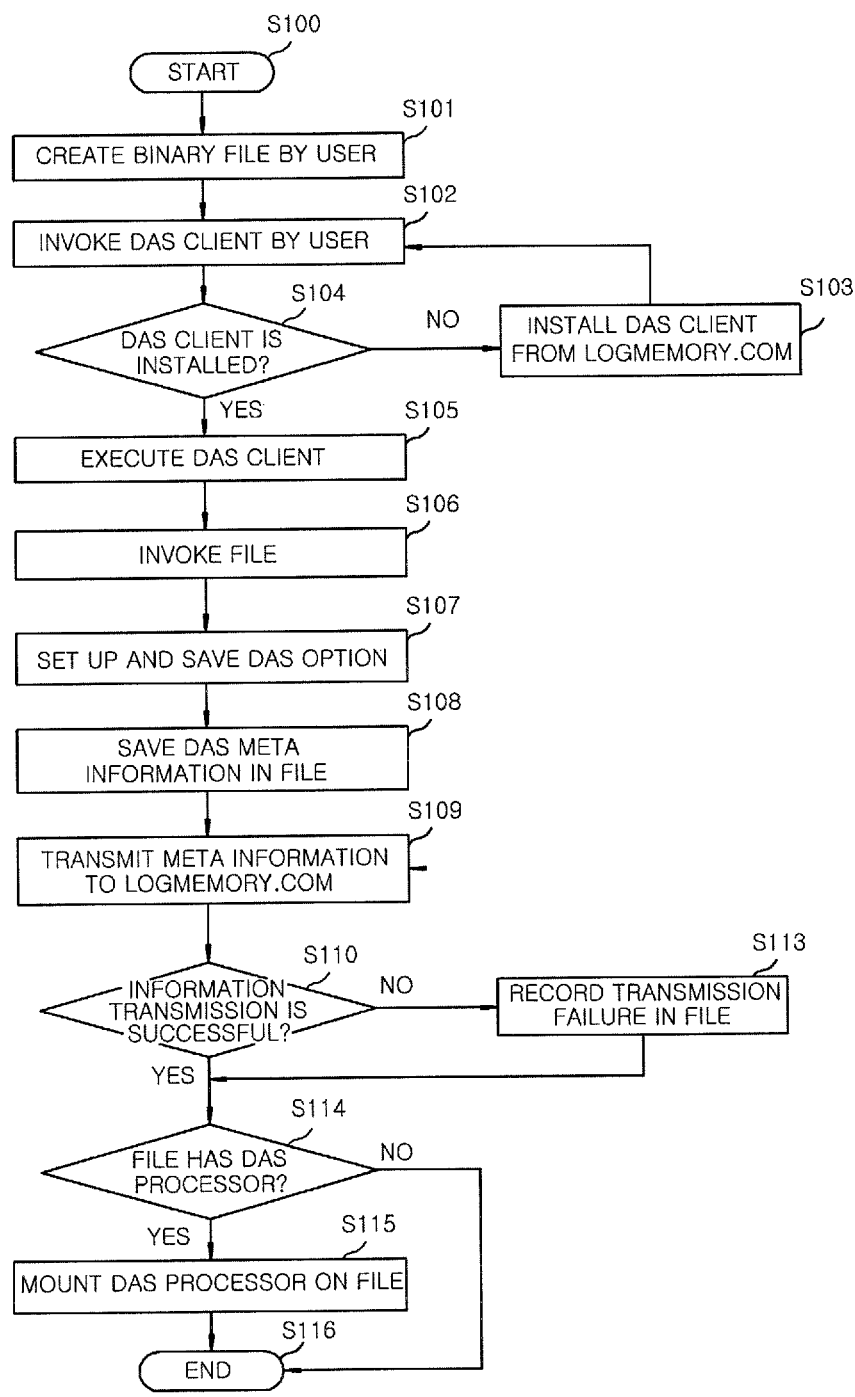
FIG. 1 is a flow diagram illustrating a process of a implementing an aging service in a file unit through a DAS client by a user in accordance with the present invention.

S400: DAS client S401: program module
S402: mounting DAS processor S403: data storage
S404: data parser S405: user interface
S600: DAS processor S601: program module
S602: file interface S603: network interface
S604: File S605: Service Provider

BEST MODE

In order to receive a digital aging service according to the present invention, an application called DAS client is necessary and users needs to download the application from separate websites (for example, www.logmemory.com could be one of the sites).

Digital aging (hereinafter, 'aging' stands for 'digital aging') means that if a certain file (a file created by a DAS client and mounted with a DAS processor) is executed under a definite condition (a state that the execution does not meet a predetermined execution cycle or number of execution within a period), the file is displayed on the monitor in a predetermined condition, not in an original image.

Moreover, in case of invoking, editing and resaving an existing file, the DAS client plays a role to insert a program called DAS processor inside the file.

The DAS processor resides within an existing file, and when the file is executed, it reads meta data in a file header saved by the DAS client, recognizes an execution cycle and type of the file, and realizes an aging effect on the file.

The aging effect, which has the same meaning as in the previous aging, is a process of changing a type of displayed file based on the number and period of the file being executed. For example, if a file not opened for more than a month is executed, the DAS processor reads meta data information, which records the most recent opening date, from a file header, recognizes that the file has not been used for more than a month before executed today, and makes the original file look old by transforming binary value which determines a program function.

There are several display methods to make a file look old; for example, fading the colour (for text files), scratching (for images), noise (for sound files), and etc. The technical principle for the above aging effects matches a file's use frequency saved in meta information to its corresponding display method and accordingly displays the file. That is, when a user opens a certain file mounted with the DAS processor, the DAS processor catches the opening moment of the file and decides what display method to use. For example, when a user opens a MS-Word file with the DAS processor mounted, the texts in the word file may look faded based on the DAS processor's calculation on the use frequency, date, and etc of the file.

To realize this, an aging management module included in the DAS processor may express a variety of effects by analyzing a file structure and mounts on the processor a method designed to analyze and display a file structure for images, videos, word documents, etc.

The most typical method is to change the binary structure of a file.

Also, the DAS processor includes a self-clear function, automatically deleting files which have not been executed for a certain period of time.

Conceptually, the self-clear function makes all the bits in a DAS processor-mounted file deleted; which means, it makes the file's size become zero (or null).

The operation principle is that if a file, near the extinction date recorded on the DAS processor, is executed, as if a virus is going around, a trigger within the file is activated and deletes all the binary in the file to make it a size-zero file.

The DAS processor also renews and saves a file's meta information including the series of the above processes, and at the same time it transmits the meta information to a web server which provides the DAS client application through the network related to the computer in which the file is saved.

The web server providing the DAS application (for example, www.logmemory.com) records and manages the meta information, and it can trace back where, when and how the files it has created are executed and managed through unique primary keys given to all the users who download the DAS application.

The files are arranged and searched through a database table managed by the unique primary keys within a database shared with the web server providing the DAS application. Also, if a file created by the DAS client with the DAS processor mounted exists in a computer which is connected to the network, such file management as deleting or revising the file may be controlled remotely.

Hereinafter, through the basic concepts and operational principles, specific technology to achieve the objectives and effects of the present invention will be described in more detail with reference to the accompanying drawings.

FIG. 1 is a flow diagram illustrating a process of implementing an aging service in a file unit through a DAS client by a user in accordance with the present invention. The user comes to create a specific binary file to draw up or produce documents (or images, videos) at (S101).

The above file creation will be omitted if a file is already created.

Next, the user executes the application of the DAS client (S400) on his/her computer at (S102).

Depending on whether the DAS client (S400) is installed or not at (S104), the user either downloads and installs the DAS client from the sites which provide the application of the DAS client (S400) at (S103) or execute the DAS client which is already installed at (S105).

The DAS client (S400) invokes the specific file by the use of any application capable of bring external files at (S106), and the user sets up and saves a DAS option at (S107).

The DAS option is to set up a condition according to execution frequency of the file. That is, if a file created in the past has not been executed for a certain period of time, a timed loop execution may be set up to have additional aging, or the frequency of loop execution may be set up so that aging is executed when the frequency is below a target number for a certain period of time.

Also, in case that a file has not been executed for a certain period of time, a self-clear function may be set up to delete all data values once executed after the time period.

If a file is executed repeatedly more than a certain number of times, aging may be set up to heal back (or to be removed).

To do this, it is preferable that the DAS option includes a condition for a time period and a frequency, and selectable radio buttons and scroll bars.

If saving is executed at (S107) after setting up the DAS option, meta information, which includes the DAS option information set up in the file and the date information on which the file is created, is saved at (S108), and then this meta information is transmitted to a server of the service provider which provide the DAS client application at (S109).

Depending on the state of network, the meta information is retransmitted to the server several times. However, if the information transmission is failed (s110), the server transmission failure is recorded in the file at (S113).

If the information transmission to the server is successfully finished, it is checked whether the file with the DAS option has a DAS processor or not at (S114).

For reference, in case a file created by the DAS client (S400) is executed and revised by the DAS client again, the DAS processor (S600) exists already, and in case a file is created by the DAS client for the first time, the DAS processor (S600) is mounted within the file at (S115) since the DAS processor (S600) does not exist.

Figure 2:
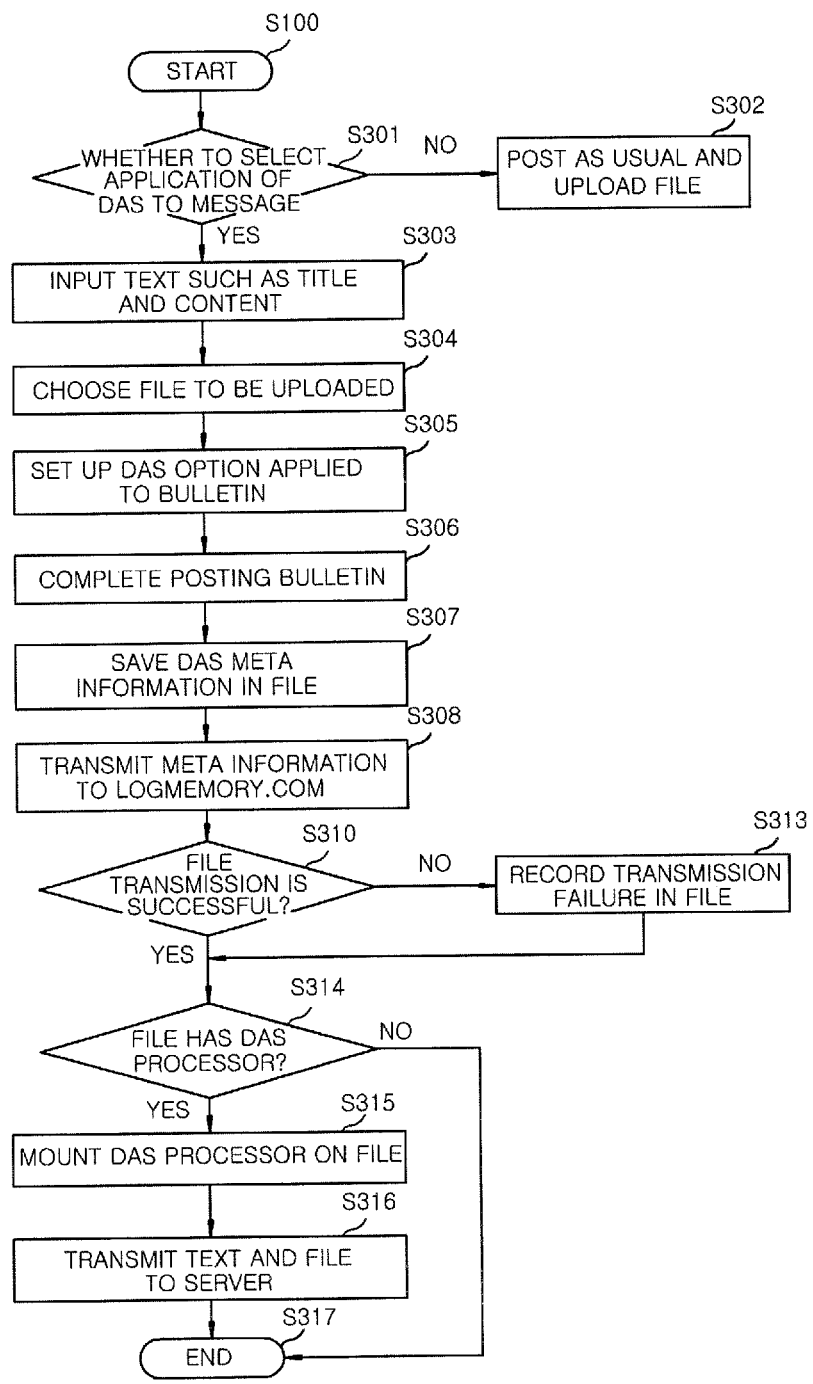
FIG. 2 is a flow diagram illustrating a process of implementing the aging service by a server to which a DAS processor is already employed.

FIG. 2 is a flow diagram illustrating a process of implementing the aging service by a server to which a DAS processor is already employed. The description related to FIG. 1 is about a service flow diagram which a user downloads the DAS client application through the websites of DAS service providers, applies the DAS option of aging to an existing file, and mounts the DAS processor. On the other hand, the description related to FIG. 2 according to the embodiment of the present invention is about a flow diagram which a server realizes the DAS processor mounting and aging in case a user writes on a website or uploads a file.

The DAS client needs to be mounted in advance on the websites (including blogs, bulletin boards, communities, etc., hereinafter called 'websites'), which are provided to users from the service provider providing the DAS client application.

The structure and function of the DAS client are the same as in FIG. 1, and more detailed information will be given in FIG. 3 which shows a block diagram of the DAS client.

In terms of posting on the websites, users can do usual common writing; however, they may also choose message posting to which the DAS option will be applied.

The DAS option-applied message provides aging effects to corresponding texts or files based on their execution number and frequency (execution period) when the texts or files on a website uploaded by a user are read or copied by the user or other users.

After inputting text such as a title and content on website bulletins at (S303) or choosing a file to be uploaded at (S304), a user may set up the DAS option applied to the bulletins through the application of the DAS client (S400) which the service provider provide to website-operating servers at (S305).

In case of an extra file uploaded on the bulletins, meta information is saved in the file at (S307) and the meta information is transmitted to the server of the service provider which provide the DAS client (S400) at (S308); accordingly, they become synchronized.

Depending on the state of network, the meta information transmitted to the service provider' server is retransmitted several times if the information transmission is not successful. In case of transmission failure to the service provider' server (s310), the server transmission failure is recorded at (S313) in database which saves the file or the website's bulletin board message.

If the information transmission to the server is successfully finished, it is checked whether the file with the DAS option has the DAS processor or not at (S314).

For reference, in case of revising an existing bulletin board message on the DAS client-applied website, the DAS processor (S600) exists. However, in case of posting a message or uploading a file for the first time, the DAS processor (S600) does not exist; therefore, in this case, the DAS processor (S600) becomes mounted within the file at (S315).

Also, at (S315), once mounting the DAS processor (S600) is finished within the uploaded file, the message (or text) or file is transmitted and saved in the database server of the website at (S316).

Moreover, when the bulletin board message with DAS option information is transmitted to the database server of the website, the meta information including the DAS option information is also saved by the DAS client (S400) within the website.

Figure 3:
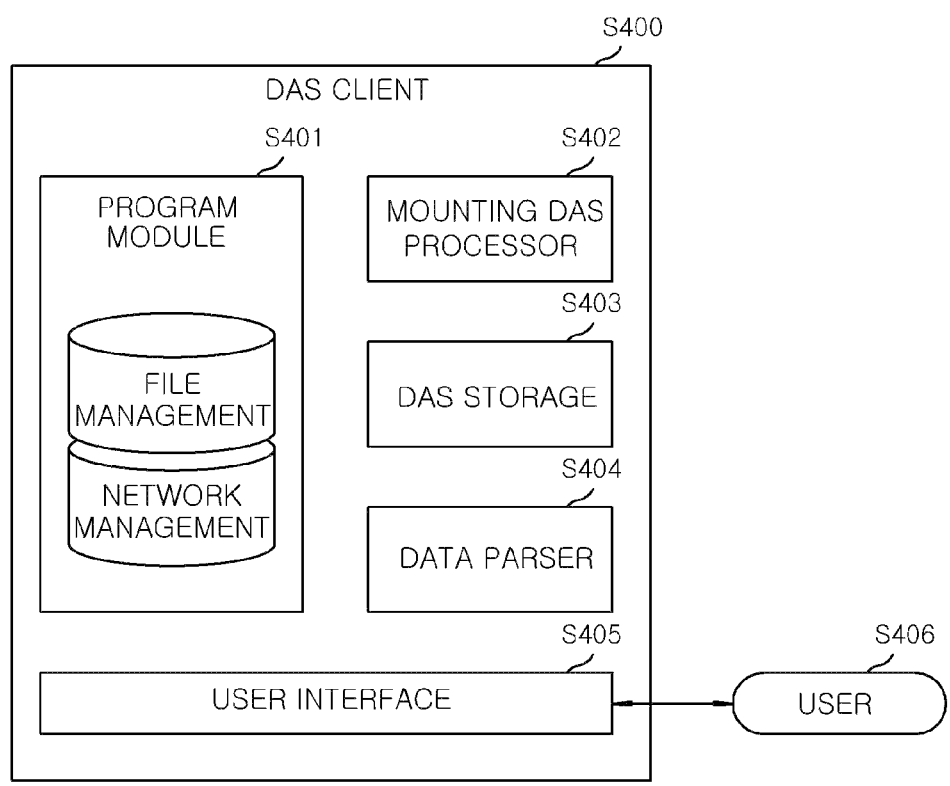
FIG. 3 is a block diagram illustrating a structure of a DAS client in accordance with the present invention.

FIG. 3 is a block diagram illustrating a structure of DAS client. The DAS client (S400) includes five modules: a program module (S401), a mounting DAS processor (S402), a data storage (S403), a data parser (S404), and a user interface (S405).

The program module (S401) is divided into file management and network management modules. The file management module is in charge of file handling such as opening or saving external files through the DAS client (S400), and the network management module is in charge of providing meta information, recorded in a file newly created by the DAS client (S400), with the server of DAS client provider (e.g., www.logmemory.com).

The mounting DAS processor (S402) is a module to make the DAS processor (S600) reside in a file newly created by the DAS client (S400).

The mounting DAS processor (S402), while the DAS processor (S600) being held, mounts the DAS processor (S600) on a file which is newly created in the same way as mouting a kind of DRM in a sound source file.

The data storage (S403) provides the DAS option with a file invoked through the file management module of the program module (S401), saves selected option information, and changes and records meta information transmitted to the service provider' server through the network management module of the program module (S401).

The meta information include following contents: whether to change a file, execution date and time, DAS option information, whether to copy or move a file, and etc.

The data parser (S605) preserves the contents for the DAS option and inserts meta information into a file opened through the user interface (S405) in the DAS client (S400).

The user interface (S405) provides command and technique used to control data input and performance thorough the DAS client (S400), and also provides environment based on file types (images, texts, videos, music files, etc) in order for users to be able to communicate with the DAS client (S400) and use it easily and conveniently.

Figure 4:
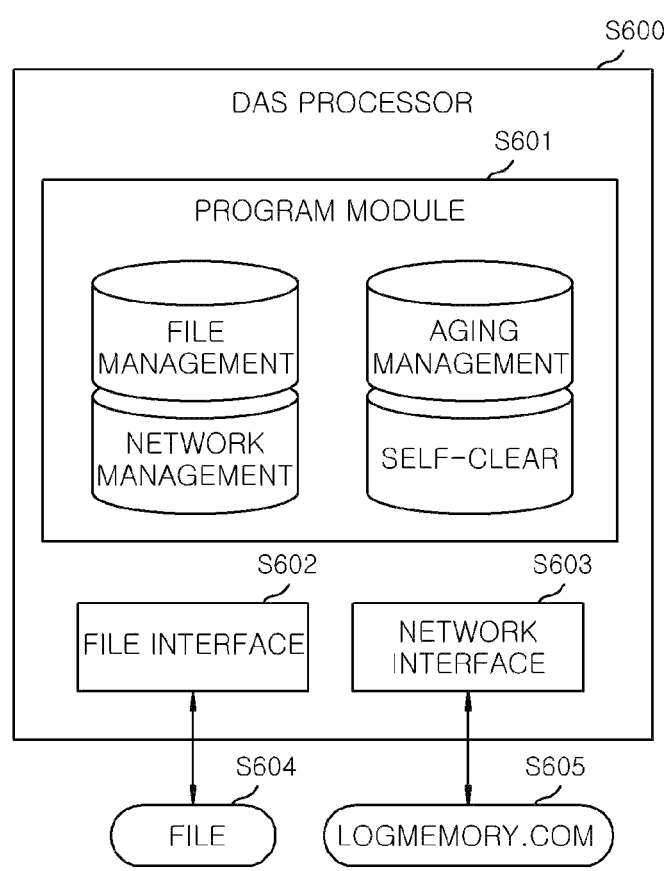
FIG. 4 is a block diagram illustrating a structure of a DAS processor in accordance with the present invention.

FIG. 4 is a block diagram illustrating a structure of DAS processor. The DAS processor (S600) resides in a file newly created through the mounting DAS processor (S402) within the DAS client (S400). When a file is executed at a certain point according to the DAS option predetermined in the DAS client (S400), the DAS processor (S600) is performed by meta information in a file header. Accordingly, the execution history of the file is renewed and this renewed information is transmitted to the service provider providing the DAS client (S400). As a result, based on an execution cycle and frequency compared to recent execution history, the DAS processor (S600) makes the file, which will be shown to users, appear againg.

For this, the DAS processor (S600) includes a program module (S601), a file interface (S602), and a network interface (S603).

The program module (S601) may also be divided into a file management module, an aging management module, a network management module, and a self-clear module.

The file management module of the program module (S601), which is a part of the file header managing the history of a file (S604), contains meta information of a file.

The meta information may include following contents: whether to change a file, execution date and time, DAS option information, primary keys, IP addresses, whether to copy or move of a file, and etc.

For reference, the DAS option information is the first information inputted through the DAS client (S400). In case the DAS option information is revised through the DAS client (S400), the meta information saved in the data storage (S403) within the DAS client (S400) is necessary to be synchronized with the file management history of the program module (S601) in the DAS processor (S600).

The network management module of the program module (S601) transmits the meta information of a file to the server of the DAS client service provider through the network interface (S603) and records a unique primary key transferred from the server in a storage within the file management module.

The unique primary key is an identification code, which is provided to each file transmitted from the DAS client (S400) or DAS processor (S600) for efficient management of tables in database servers of the DAS client service provider.

Even when the meta information renewed from a file, which already has a preprovided primary key, is transmitted to the database server in the DAS client service provider, the database server identify the primary key first within the tables and records the information in the tables of the primary key, thereby operating the database performance efficiently.

The database tables also record an IP address corresponding to each primary key.

That is, when meta information renewed from a file, which has a preprovided primary key, is transmitted to the database server, the IP address associated to the primary key is identified; therefore, if the IP address is different, even if it is the same meta information by the identical primary key, the file is considered copied or moved.

Operation and management method of the database server for yes or no as to replication of files will be explained in detail with reference to FIG. 5.

If a file (S604) is executed by a user, meta information, which includes information such as the DAS option saved in the file management module within the program module (S601) through the file interface (S602), is invoked. And, through the invoked meta information, if the latest execution date of the file and the execution frequency for a certain period of time do not meet the predetermined DAS option, the aging management module makes the file look old by revising the binary within the file.

That is, the file may be displayed differently based on the number and period of file execution. For example, aging may be set up to start if a file is not executed more than a week or less than 10 times within a month.

The aging may be weighted to allow degrees of aging effects to increase more rapidly; for example, on the basis of more than 2 weeks, or more than 3 weeks, etc.

As explained, if a file is executed after a certain period of time predetermined in the DAS option in the DAS client (S400), the aging management module of the DAS processor (S600) reads the meta information, which records the most recent open date, from a file header, recognizes that the file has not been used for more than a month before executed at the moment, and makes the original file look old by transforming the binary which determines the program functions.

Also, the program module (S601) of the DAS processor (S600) includes a self-clear function, automatically deleting files which have not been executed for a certain period of time.

Conceptually, the self-clear function makes all the bits of the DAS processor-mounted files deleted and the file sizes become zero (or null). A deletion cycle for the file, as if a virus is going around, may be set up at the DAS option in the DAS client (S400), and the DAS processor (S600), containing the predetermined information, triggers the self-clear function when the file near the deletion date is executed, and deletes all the binary within the file and makes it a size-zero file.

Figure 5:
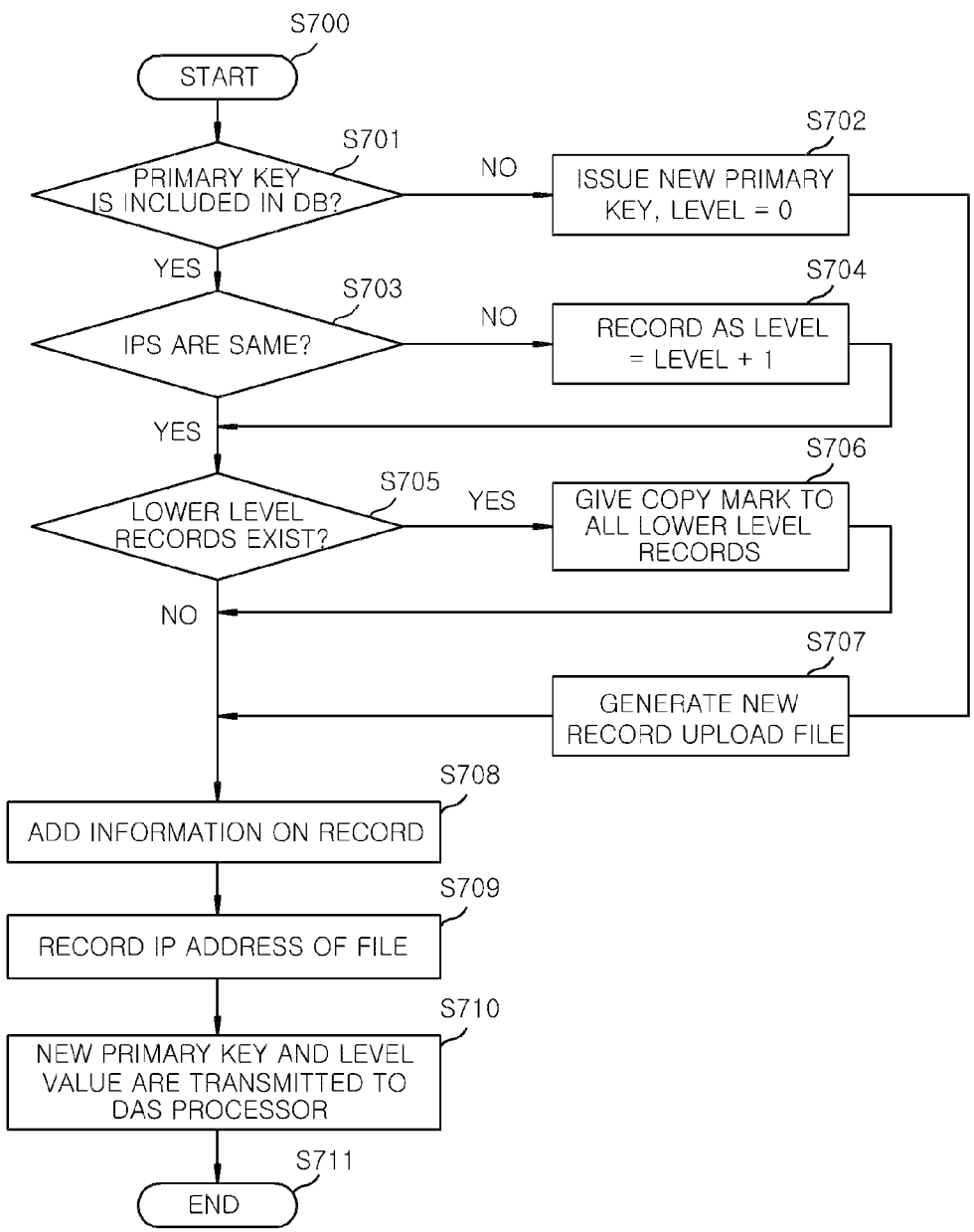
FIG. 5 is a flow diagram illustrating a process of providing an aging service by a user to which the DAS processor is applied in accordance with the present invention.

FIG. 5 is a block diagram illustrating a structure of database for control and integrated management of a system in accordance with the present invention. In case that the database server of the service provider (S605) receives meta information of a DAS option-applied file from the DAS client (S400) or DAS processor (S600), a process is performed to make sure whether a primary key information is included within the meta information at (S701). If the primary key is not included, a new primary key is issued and the table level number 0 is given at (S702).

Once a level is given, a new record is generated on the database table at (S707) and the meta information including a user's IP address is written (S708) on the record at (S708). Also, The new primary key and level value are transmitted to the DAS processor (S600) from which the meta information is transmitted at (S710).

In the process (S701) of checking whether a primary key information is included in the meta information, if there is the primary key within the meta information, a process goes to (S703) to compare two IP addresses: the IP address on the existing record where the primary key is registered and the user's IP address transmitted in the meta information.

If the user's IP address and the IP address on the record are different, a value of 1 is added to the already-given level value.

Once the comparison process between the two IP addresses is finished at (S703), a process to check level values is performed at (S705).

When comparing a level value on the record and a level value in the transmitted meta information, if the level value on the record is higher than the transmitted level value, a copy mark is given to the lower level record having a higher level value at (S706).

The copy mark indicates that a file on the IP address recorded on the lower level record is the replication file copied from the original one.

That is, if meta information with a different IP address is transmitted, the file providing the meta information is either copied or moved from the original one.

The level value, however, increases by 1 when the IP addresses are different. Therefore, when a user later transmits meta information from a specific IP address later, the level value in the meta information is compared with the level value on the existing record. Consequently, if there is a record having a higher level value between the two, the file on the IP address of the corresponding record is recognized as copied.

That is, in case of a moved file, the level value in the meta information of the file is same as the level value on the record; however, in case of a copied file, the given level value, because of the IP address change, is higher than the level value on the existing record. Therefore, it is possible to recognize whether a file is copied or moved.

Once a process of checking whether there exists a lower level record having a higher level value is finished at (S715), a process of adding renewed information to the record which has the same primary key as the transmitted meta information is performed at (S708), and then the IP address in the meta information is recorded at (S709). After that, the level and copy (mark) information is transmitted to the DAS processor-mounted file of the user who transmitted the meta information at (S710).

Figure 6:
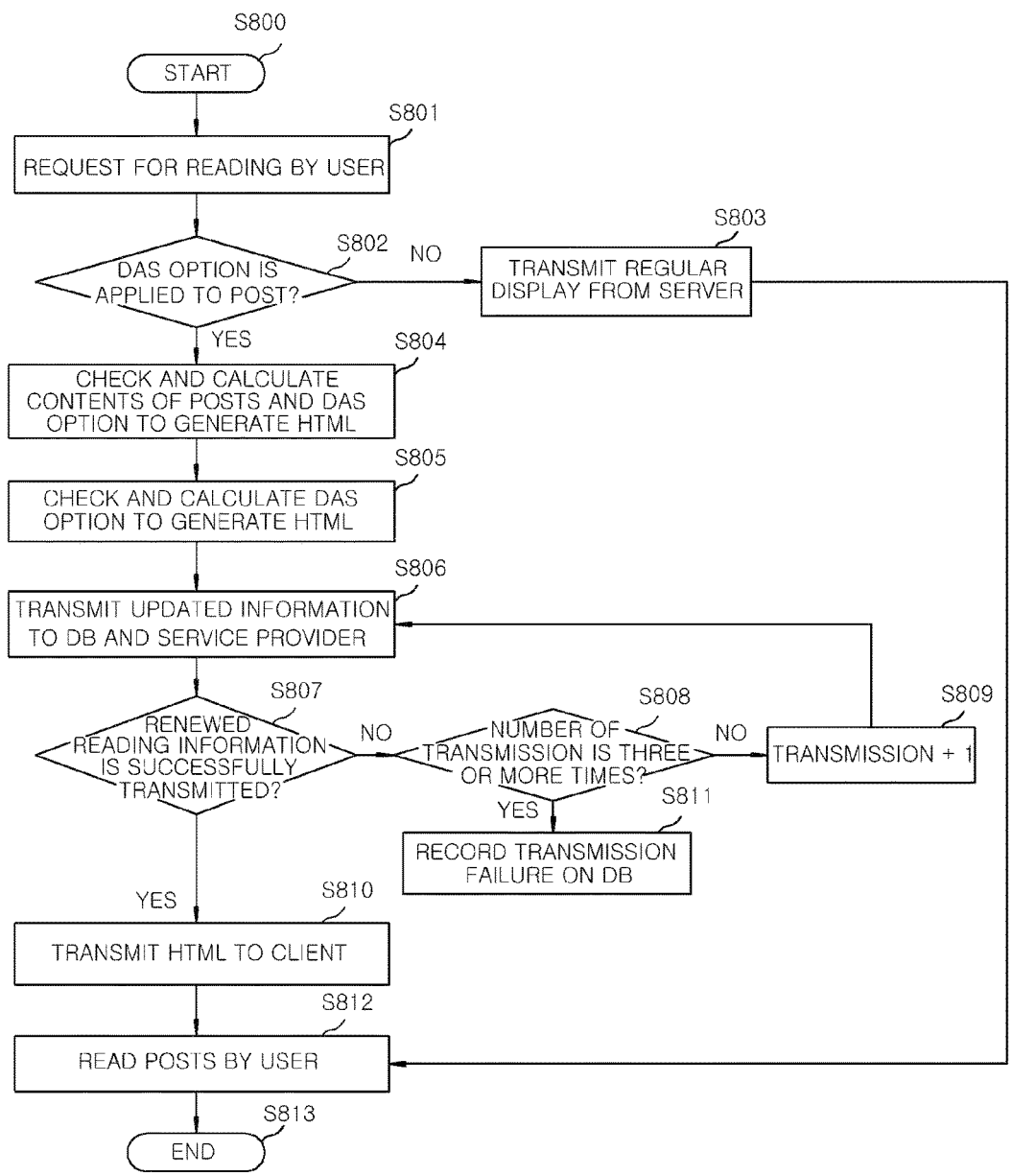
FIG. 6 is a flow diagram illustrating a process of providing an aging service by a server to which the DAS processor is applied.

FIG. 6 is a flow diagram illustrating a process of providing an aging service by the DAS processor-applied server. DAS client FIG. 6 depicts a technical construction of aging effects expressed according to a read cycle and period when postings freely uploaded by users are read by others on websites (including blogs, bulletin boards, café, etc) which are mounted with DAS client and provided to users, through an alliance with service providers providing a DAS client application illustrated in FIG. 2.

If general users request a reading about posts on blogs, bulletin boards, communities, etc. (this may be an event to click a computer mouse) to servers at (S801), a process is performed to check whether the DAS option is applied to the posts at (S802). If the DAS option is not applied, a regular display is transmitted from the server at (S803) and the user reads the posts at (S812).

However, if the DAS option is applied to the posts, the web server of the website provider brings the contents of the posts and DAS option information from the database server at (S804), checks recent request records from the database, and generates aging with HTML after determining a degree of aging to be displayed on the monitor according to predetermined DAS option conditions.

Such aging may include fading the colour, scratching, noise, transparency, and etc. Depending on the degree of aging to be applied, the DAS processor (S600) mounted on the server displays aging on the front page of the website using a hypertext language.

After this, renewed information, such as the date, number, place of a post being read by the user, is transmitted to the server of the service provider providing the database and DAS client located in the website.

A process, to check whether the renewed reading information is transmitted to the service provider, is performed at (S807). If the renewed reading information, despite repeated tries, is not be transmitted to the service providers due to a network problem, etc., transmission failure is recorded on the website database at (S811).

If the renewed reading information is successfully transmitted, aging-applied webpages are transmitted to the user who requested the reading at (S810) and aging-applied texts are displayed to the monitor of the user at (S812). The user recognizes the aging effects from the applied texts on the monitor, and comes to read more often through an aesthetic appreciation and text aging. From time to time, after a certain period of time, the texts become deleted automatically.

Since the technical construction related to the deletion has already been illustrated with the self-clear method through the DAS processor (S600) in FIG. 4, it is omitted.

The invention claimed is:

1. A method of executing an application for an aging service in a user terminal that communicates with an aging service server, the method comprising:
running the application;
loading a file to apply the aging service in the application;
receiving an aging option to be applied to the file;
loading a processor for the aging service within the file; and
applying the aging option to the file by using the processor,
wherein the processor is configured to save meta information in the file, the meta information having an IP address of a user, a value of the aging option and history of the file,
wherein the processor is configured to transmit the meta information to the aging service server, receive an identification code assigned to the file to trace and manage the file from the aging service server, and record the identification code,
wherein the aging service server is configured to determine whether the file is copied or moved based on the identification code and the IP address of the user to trace the file,
wherein the aging service server is configured to manage the file remotely by deleting or revising the file based on the identification code, and
wherein the aging service is configured to give an aging effect to the file if a time elapsed from a time of previous execution of the file takes more than a predetermined time.

2. The method of claim 1, wherein the aging effect provides scratching, transparency, or noise effects to make the file appear aging.

3. The method of claim 1, wherein the aging effect causes the file to be deleted.

4. The method of claim 2, wherein the aging option is an option to be able to select the predetermined time or the aging effect.

5. The method of claim 1, wherein the file is any one of a document file, an image file, a music file, and a video file.

6. A method of operating a server for an aging service executed in cooperation with an application for the aging service, the method comprising:
receiving meta information of a file from a processor for the aging service of a user terminal, the meta information including an IP address of a user, a value of an aging option and history of the file;
determining whether an identification code to trace and manage the file is included within the meta information and issuing an identification code when one is not included within the meta information;
transmitting the identification code to the processor of the user terminal; and
when the file meets an aging condition according to the value of the aging option included in the meta information, transmitting an instruction to execute the aging service to the processor, wherein the aging service server is configured to determine whether the file is copied or moved based on the identification code and the IP address of the user to trace the file, wherein the aging service server is configured to manage the file remotely by deleting or revising the file based on the identification code wherein the aging service is configured to give an aging effect to the file if a time elapsed from a time of previous execution of the file takes more than a predetermined time.

7. The method of claim 6,
wherein the aging option is the predetermined time.

8. The method of claim 6, wherein the value of the aging option is a value of the predetermined time or the aging effect that is selected.

9. A method of operating a server having an application for an aging service that communicates with an aging service server, the method comprising:
receiving a file to apply the aging service through a network;
receiving an aging option to be applied to the file;
loading a processor for the aging service within the file;
applying the aging option to the file by using the processor and saving the file; and
posting the file,
wherein the processor is configured to save meta information in the file, the meta information having an IP address of a user, a value of the aging option, and history of the file, wherein the processor is configured to transmit the meta information to the aging service server, receive an identification code assigned to the file to trace and manage the file from the aging service server, and record the identification code, wherein the aging service server is configured to determine whether the file is copied or moved based on the identification code and the IP address of the user to trace the file, wherein the aging service server is configured to manage the file remotely by deleting or revising the file based on the identification code wherein the aging service is configured to perform an aging effect on the file if the file is not inquired or executed within a prefixed time period from a time of posting of the file.

10. The method of claim 9, wherein the aging effect provides scratching, transparency, or noise effects to make the file appear aging.

11. The method of claim 9, wherein the aging effect causes the file to be deleted or causes a bulletin including the file to be deleted.

12. The method of claim 9, wherein after performing the aging effect on the file, if the file is inquired or executed, a de-aging effect is given to the file.

13. The method of claim 12, wherein the de-aging effect is to recover the file from the aging effect to restore the file to its original state.

* * * * *